INVENTOR
KEES TEER
BY Fred M. Vogel
AGENT

Oct. 6, 1959 K. TEER 2,907,817

DEVICE FOR SIMULTANEOUSLY PRODUCING A PLURALITY OF TELEVISION INFORMATION SIGNALS

Filed Oct. 25, 1954 2 Sheets-Sheet 2

INVENTOR
KEES TEER
BY Fred M. Vogel
AGENT 2,907,817

DEVICE FOR SIMULTANEOUSLY PRODUCING A PLURALITY OF TELEVISION INFORMATION SIGNALS

Kees Teer, Eindhoven, Netherlands, assignor, by mesne assignments, to North American Philips Company, Inc., New York, N.Y., a corporation of Delaware Application October 25, 1954, Serial No. 464,541

Claims priority, application Netherlands November 14, 1953

5 Claims. (Cl. 178—5.4)

For reproducing a scene in substantially natural colours colour television requires, at the receiving end, the presence of information about brightness and colour of the scene concerned. Systems are known in which such information is emitted by the transmitter in time sequence and other systems in which such information is emitted simultaneously. In the latter case the signals relating to the different kinds of information required are to be produced simultaneously at the transmitting end; in the former case this may likewise take place simultaneously, each signal then being emitted only during determined periods, but it is not strictly necessary. The information signals may in this case be produced, for example, with the use of a black-and-white television camera having alternately arranged in front of it filters which each pass only a determined colour component of the light originating from the scene. If the required information signals are to be produced simultaneously, use may be made of a television pick-up camera comprising (in the case of three-colour television) three pick-up tubes each having a filter passing a determined primary colour. The signals produced by the three pick-up tubes may now be transmitted together with the required synchronisation signals. If desired, it is also possible to transmit linear combinations of the signals thus produced.

The object of the invention is to provide a device in which a plurality of television signals are produced by one pick-up tube for cases in which a plurality of television information signals are produced simultaneously as in colour television and in stereo television. This affords the advantage not only that the number of pick-up tubes is smaller than that without the use of the invention, but also that a plurality of television signals are produced in scanning a plurality of images of an object about which the television signals must contain information with the use of one cathode-ray beam. As is well-known, in colour-television and stereo-television receivers the superposition of the various partial images for producing the ultimate picture is a measure of the quality of this picture. In order to arrive at a satisfactory superposition, it is necessary inter alia that the scanning frames written by the various cathode-ray beams should be identical as far as possible both at the receiving and the transmitting end. The smaller the number of different scanning frames, the smaller the possibility of differences between the scanning frames.

According to the invention, the device comprises means by which in scanning at least one image of an object about which the television signals must contain information, which image is produced by an optical system with limited definition on the photo-sensitive screen of a pick-up tube, a carrier-wave is produced in the output circuit of the pick-up tube, on which a signal relating to the image concerned is modulated, the frequency of the carrier-wave and the limitation of the definition of the image being such that a separation sufficiently free from interference between the frequency range of the modulated carrier wave or at least the frequency range of one side-band thereof and the frequency ranges occupied by modulated carrier waves produced in an analogous manner or by signals not modulated on a carrier wave is possible with the use of electric filters.

In order that the invention may be readily carried into effect, it will now be described with reference to the accompanying drawings, given by way of example, in which.

Figure 4:
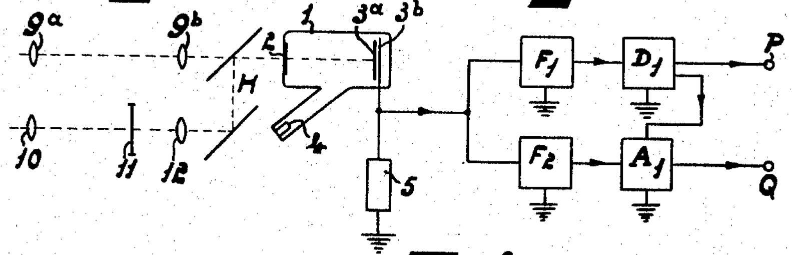
Figure 5:
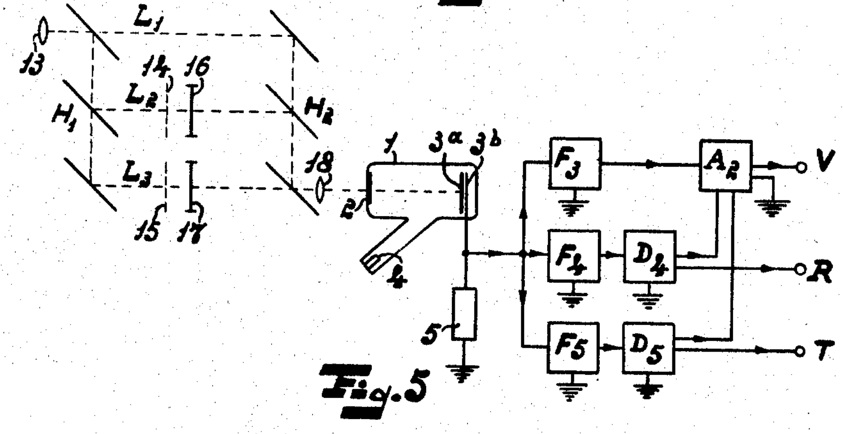

Figs. 4 and 5 also show devices according to the invention.

Figure 6:
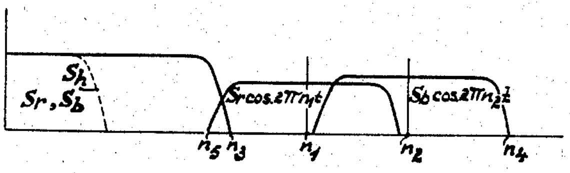

Fig. 6 shows the signals produced in the output circuit of the device shown in Fig. 5, and Fig. 7 shows a lattice as may be used in the device of Fig. 5.

Figure 1:
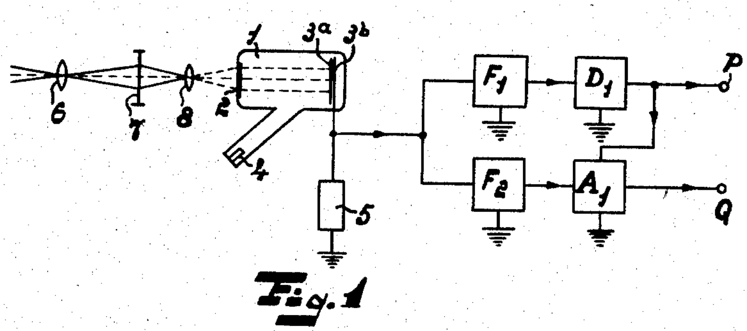
Fig. 1 shows a device according to the invention.

Fig. 1 shows diagrammatically one embodiment of a device according to the invention intended for producing two colour signals. 1 indicates a pick-up tube of the type known under the name picture iconoscope, 2 indicating the photo-sensitive screen thereof. An electron gun 4 produces a beam scanning in the usual manner a screen 3*a* under the action of deflection means (not shown), resulting in a television signal being produced in known manner across an impedance 5 connected to a signal plate 3*b*. It is noted that the kind of pick-up tube has been chosen quite arbitrarily and that any other pick-up tube may be imagined to be substituted in the figure. The optical system, which is shown diagrammatically only, comprises a lens 6 producing an image of the object, for example a living scene or a colour film picture, with limited definition, on a plate 7 which is again shown separately in Fig. 2. The plate 7 consists of material passing, for example, red light throughout its surface, but also passing green at determined areas only. Thus, in Fig. 2, the strips *a* pass both red and green light and the strips *b* only transmit red light and do not transmit green light or to a very small extent only. This implies that plate 7, on the one hand, does not constitute an obstacle for the incident red light and, on the other hand, fulfils the function of a lattice for the incident green light. The plate 7 is now sharply projected on the photo-sensitive screen 2 with the use of a lens 8, resulting in a charge image being produced on screen 3*a* due to photo-emission of screen 2. It is to be noted that the strips *a* and *b* are at angles $\neq 0$ with lines corresponding to the scanning lines written on the screen 3*a* by the cathode-ray beam.

In scanning the screen 3*a* by means of the cathode-ray beam several signals occur across the impedance 5. The image on screen 2, produced by the red light, provides a signal $S_r$ across the impedance 5 which in regard to frequency extends from 0 to a frequency $n_0$. (The direct-current component must, as usual, be added to the signal in a different manner known per se). The fact that the signal $S_r$ does not extend throughout the frequency range of the pick-up tube is due to the object being reproduced on the plate 7 with limited definition only. This limitation of frequency is not objectionable, since television information signals are in most cases limited in frequency, inter alia in connection with the available bandwidth of the transmission path.

Figure 2:
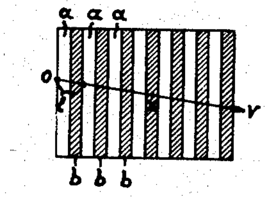
Fig. 2 shows a lattice such as used in the device of Fig. 1.

The image on screen 2 produced by the green light results in a charge image on the screen 3*a* and this provides in scanning a signal across the impedance 5, which signal, as known per se, comprises, on the one hand, a signal proportional to a signal as would be produced in scanning an image which has not passed a lattice and, on the other hand, a carrier-wave on which this signal is modulated, since the lattice for the green light may be written in Fourier development:

$$c_0+c_1 \cos 2\pi\frac{x}{l}+c_2 \cos 2.2\pi\frac{x}{l}+ \cdots$$

wherein $l$ is the period of the lattice and $x$ the distance between a point on the lattice and the zero point in a direction parallel to the scanning direction $r$ (see Fig. 2). An analogous expression is found for an image of the said lattice on the photo-sensitive screen 2. When the image of the object on the lattice may be represented on the line $r$ by $f(x)$, the total light distribution along the considered line, as far as the green light is concerned, may thus be written as:

$$f(x)\left[c_0+c_1 \cos 2\pi\frac{x}{l}+c_2 \cos 2.2\pi\frac{x}{l} \cdots\right]$$

and the light distribution along the corresponding line on the photo-sensitive screen 2 as:

$$Af(px)\left[c_0+c_1 \cos 2\pi\frac{px}{pl}+c_2 \cos 2.2\pi\frac{px}{pl}+ \cdots\right]$$

wherein $p$ represents the ratio between a determined distance on screen 2 and the corresponding distance on the lattice. If, now, the charge image of such a line is scanned at a speed $v$, the signal across the impedance 5 may be written as:

$$Bf(vt)\left[c_0+c_1 \cos 2\pi\frac{vt}{pl}+c_2 \cos 2.2\pi\frac{vt}{pl} \cdots\right]$$

or as:

$$Bf(vt)\ [c_0+c_1 \cos 2\pi n_1 t+c_2 \cos 2.2\pi n_1 t+ \cdots]$$

wherein $$\frac{v}{pl}$$

is assumed to be equal to $n_1$. For the sake of simplicity the image on screen 2 and the charge image on screen 3a are assumed to be congruent. Now $Bc_0f(vt)=S_g$ is a signal proportional to the signal which would be produced in scanning an image which has not passed a lattice, and $Bc_1f(vt) \cos 2\pi n_1 t=CS_g \cos 2\pi n_1 t$ represents a carrier-wave of frequency $n_1$ on which the said signal is modulated. As will appear hereinafter, the higher harmonics of this carrier wave which also occur are negligible. At a given scanning speed $v$, it is necessary for $l$ and $f(x)$ to be so chosen that the frequency spectrum of $S_g$ and of $CS_g \cos 2\pi n_1 t$ do not overlap or at least overlap to so small an extent that the further use of the information signals obtained in a manner which will be described hereinafter is not interfered thereby. $l$ is determined by the lattice and $f(x)$ by the definition of the image produced on the lattice.

Figure 3:
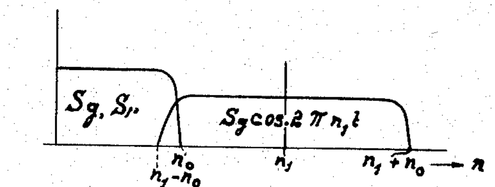
Fig. 3 shows the signal produced in the output circuit of the device shown in Fig. 1.

Fig. 3 shows the frequency spectrum of the signals thus produced. As a matter of fact, the maximum frequency occurring in the signal $S_g$ is, in the chosen example, equal to the maximum frequency occurring in the signal $S_r$, since the corresponding images are reproduced on the lattice 7 with equal definition. The signals $S_g$ and $S_r$ may be individually obtained from the signal occurring across impedance 5 in the following manner. The output signal across impedance 5 is supplied, on the one hand, to a band-pass filter $F_1$ having cut-off frequencies $n_1-n_0$ and $n_1+n_0$ and, on the other hand, to a low-pass filter $F_2$ having a cut-off frequency $n_0$. The output signal of $F_1$ is supplied to a detector $D_1$. This results in the signal $S_g$ occurring across output terminal P, which signal is supplied, if desired after amplification, to an adding device $A_1$, which has also supplied to it the output signal $S_r+S_g$ of the filter $F_2$. $S_r+S_g$ and $S_g$ are subtracted from one another in $A_1$, resulting in the signal $S_r$ occurring across the output Q.

It will be evident that in connection with the filters $F_1$ and $F_2$ the higher harmonics of the carrier wave of frequency $n_1$ are immaterial.

It is noted that, instead of producing a sharp image of plate 7 on the screen 2, it is naturally also possible for plate 7 to be arranged itself on the screen 2; in the formulas this implies that $p$ is chosen to be equal to 1. Lens 8 is not required in this case.

Furthermore, it is possible to make the photo-sensitive screen 2 fulfil itself the function of plate 7, viz. by composing the photo-sensitive layer of strips similar to the strips of plate 7, determined strips being sensitive to, for example, red and green and others being sensitive to green only and not sensitive to red or at least to a small extent.

It is possible both in the case of the colour filter shown in Fig. 2 and in the case of the photo-sensitive screen which itself fulfils the function of plate 7 that the kind of light which has to be transmitted by all strips or which has to lead to emission on all strips leads for the strips having to transmit one colour only or for the strips sensitive to one colour only to results which are different from those for the strips having to transmit both colours or having to be sensitive to both colours. Thus, for example, the plate 7 may attenuate the red light on the strips *a* to a greater extent than on the strips *b*. An even illumination of the plate 7 by red light then does not result in an even charge image on screen 3a. This implies that not only $S_g$, but also a fraction of $S_r$ is modulated on the carrier wave. Demodulation of the carrier wave then provides, instead of $S_g$ alone, also a fraction of $S_r$, viz. $aS_r$, wherein $a$ represents a constant. The output signal of filter $F_2$ was $S_g+S_r$. It will be evident that the signals $S_g$ and $S_r$ may be found from the signals $S_g+aS_r$ and $S_g+S_r$ with the aid of of linear combinations similar to those described with reference to Fig. 1. However, it is possible to correct already before the demodulation of the carrier wave, for example by giving a higher intensity to the scanning cathode-ray beam on the strips of the charge image on which the charge is smaller than with an even charge image as would be due to occur by the action of an even illumination.

Fig. 4 shows an embodiment according to the invention adapted for stereo-television. Identical parts of Figs. 1 and 4 are indicated by the same reference numerals. The object is projected with limited definition, on the one hand, on the screen 2 with the use of lenses 9a and 9b and, on the other hand, projected with limited definition on a lattice 11 with the use of a lens 10. In this case the lattice is built up from material of which, for example, the strips *a* (see Fig. 2) pass the whole visible spectrum and the strips *b* are opaque for this whole spectrum. The image of the said lattice is also projected with the use of a lens 12 and through a system of semi-transparent mirrors H on the screen 2 of the pick-up tube. The signal produced across the impedance 5 is similar to that described with reference to Fig. 1 and the two signals, which contain different information about the object, may be obtained in a similar manner as indicated hereinbefore.

As a matter of fact, a device intended for producing two colour signals may likewise comprise two spatially separate light-paths as in the device shown in Fig. 4. However, it is then necessary to provide colour filters in the two light paths.

For simultaneously producing three information signals about the same object intended for three colour television, it is possible to produce two signals in the above-described manner with the use of a pick-up tube and the third signal with the use of a separate pick-up tube. If necessary, linear combinations may be formed from the signals thus obtained. The brightness signal will advantageously be chosen for the third signal. It is thus avoided that in composing the brightness signal of three signals, each relating to a primary colour of the object, misregistration of the brightness may occur in the image ultimately reproduced, which is very troublesome. In this connection it is to be considered that misregistration of brightness is considerably more interfering than misregistration of colour.

However, it is alternatively possible to produce the three signals with the use of one pick-up tube. Fig. 5 shows an embodiment of the invention in which three information signals are produced with the use of one pick-up tube. 1 indicates, as before, the pick-up tube comprising the photosensitive screen 2, screen 3*a* and the signal plate 3*b*, 4 indicates the electron gun and 5 indicates the impedance from which the output signal of the pick-up tube is derived. Lens 13 produces of the object with the use of the semi-transparent mirror systems $H_1$ and $H_2$, on the one hand, an image of limited definition via light path $L_1$ and a lens 18 on the screen 2 and, on the other hand, images of limited definition via light paths $L_2$ and $L_3$, including colour filters 14 and 15, on lattices 16 and 17. The lens 18, in turn, produces sharp images of the lattices on the screen 2. The fineness of the lattices is chosen differently, that is to say such that in scanning the screen 3*a*, the signal across impedance 5 exhibits, for example, a frequency spectrum as shown in Fig. 6. The image produced via light path $L_1$ yields the signal portion $S_h$, for example of large bandwidth, and provides, for example, the normal black-and-white information about the object. It is alternatively possible to provide a colour filter, for example a green filter, in the light path $L_1$, the image then naturally providing information about the green light emitted by the object. If filter 14 passes red light only, the image produced by the light path $L_2$ provides a signal $S_r$, for example of small bandwidth, according to the definition of the image produced on the lattice 16, and a signal $S_r \cos 2\pi n_1 t$ with information about the red light emitted by the object. If filter 15 passes blue light only, the image produced via light path $L_3$ yields signals $S_b$, if desired likewise of small bandwidth, and signals $S_b \cos 2\pi n_2 t$ with information about the blue light emitted by the object. The frequency ranges of $S_r \cos 2\pi n_1 t$ and $S_b \cos 2\pi n_2 t$ may overlap between the frequencies $n_1$ and $n_2$, as shown in the figure. However, it is in this case necessary to utilise single sideband detection.

The output signal of the pick-up tube across the impedance 5 is supplied to three filters $F_3$, $F_4$ and $F_5$. $F_3$ is a low-pass filter having a cut-off frequency $n_3$, $F_4$ is a bandpass filter having cut-off frequencies $n_5$ and a frequency slightly higher than $n_1$, and $F_5$ is a bandpass filter having cut-off frequencies $n_4$ and a frequency slightly lower than $n_2$. The output signals of $F_4$ and $F_5$ are supplied to demodulators $D_4$ and $D_5$, across output terminals R and T of which the signals $S_r$ and $S_b$ occur. The signals $S_r$ and $S_b$, if desired after amplification, are combined in proper size and phase with the output signal of $F_3$ in an adding device $A_2$, for example in such manner that the signals $S_r$ and $S_b$ initially present therein are just absent, or in such manner that a desired combination of $S_h$, $S_r$ and $S_b$ occurs at the output terminal V.

It will be evident that the function of colour filter 14 and lattice 16 may be fulfilled by a plate positioned at the area of lattice 16, of which determined strips only transmit red light and the other strips are fully opaque. The same remark naturally applies to colour filter 15 and lattice 17. If desired, the semi-transparent mirror systems may have a colour-sorting action.

Figures 7A, 7B, 7C:
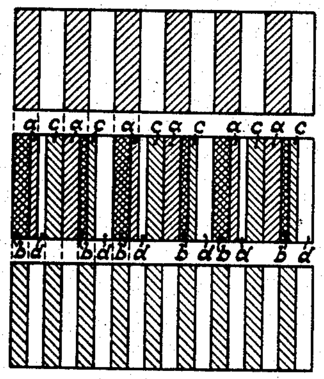

It is also possible to combine the light paths $L_2$ and $L_3$ by causing the functions of colour filters 14, 15 and lattices 16, 17 to be fulfilled by a plate as shown in Fig. 7*a*, which is arranged at the area of one of the initial lattices 16 and 17. In Fig. 7*a*, the strips *a* with left-hand cross hatching transmit red light only, the strips *c* with right-hand cross-hatching transmit blue light only, the strips *b* with double cross-hatching transmit red and blue light and the strips *d* without cross-hatching are opaque. Fig. 7*b* shows in what manner the plate of Fig. 7*a* behaves for red light and Fig. 7*c* shows in what manner the said plate behaves for blue light. When using a plate as shown in Fig. 7*a*, the semitransparent mirror systems may be of simpler design, since in this case one of the light paths $L_2$ and $L_3$ is not required.

If the light path $L_1$ initially also contains a colour filter, for example a green filter, the number of light paths may be reduced to one by providing for all strips *a, b, c, d* of the plate shown in Fig. 7*a* to be transparent for green light. In this case the semi-transparent mirror systems may be completely dispensed with. If desired, it is possible, as before, to arrange the plate on the screen 2 and in this case also the screen 2 may fulfill the function of the plate.

It is naturally possible to produce images of an object only via two or more lattices, that is to say no image without the intermediary of a lattice as in the device shown in Fig. 5. In such a case it is sufficient to detect the various modulated carrier waves. It is thus not necessary to form linear combinations with unmodulated signals occurring across the impedance 5 and, furthermore, the direct-current components are present in the demodulated signals and thus need not be introduced. If desired, it is naturally possible to form linear combinations from the signals found by demodulation of the various carrier waves.

What is claimed is:

1. Apparatus for converting a plurality of different visual aspects of television information into corresponding electrical signals, comprising a photoelectric pick-up tube having a scanned photo-sensitive screen and a signal output electrode, a lens system having limited definition, means for projecting a first one of said visual aspects through said lens system and onto the entire surface of said screen, means for projecting another of said visual aspects onto said screen in a periodical lattice pattern which periodically crosses the scanning pattern of said screen, and means for scanning said screen thereby to produce at said output electrode a first signal corresponding to said first visual aspect and having a relatively low frequency range as determined by said limited definition, and a second signal having an unmodulated component lying at least in part in said relatively low frequency range and a component which is modulated on a carrier wave, said carrier wave being produced by the scanning of said lattice pattern and the frequency of said carrier wave being dependent upon the periodicity of said lattice pattern, said lattice pattern having a periodicity sufficiently great with respect to the value of said limited definition so that said modulated carrier wave occupies a frequency range which lies partly within and partly outside of said relatively low frequency range.

2. Apparatus as claimed in claim 1, in which said means for projecting said visual aspects onto said screen comprises a color filter positioned in the optical path of said pick-up tube and adapted to pass over its entire surface said one visual aspect and to pass over periodically arranged portions of its surface said other visual aspect.

3. Apparatus as claimed in claim 2, in which said color filter is arranged on said photo-sensitive screen.

4. Apparatus as claimed is claim 1, including a first electrical filter which passes only frequencies in the frequency range of said modulated carrier wave, a second electrical filter which passes only frequencies in said relatively low frequency range, a detector, and a subtracting stage, said first electrical filter being connected between said output electrode and said detector, said second electrical filter being connected between said output electrode and an input of said subtracting stage, and means connected to feed the detected output signal from said detector to an input of said subtracting stage.

5. Apparatus as claimed in claim 4, including means for projecting a third visual aspect onto said screen in a periodical lattice pattern which periodically crosses the scanning pattern of said screen with a different periodicity from that of said first-named lattice pattern thereby causing a second modulated carrier wave to occur at said output electrode which has a bandwidth lying at least in part outside of the frequency ranges of said low frequency range and of said first-mentioned modulated carrier wave, a second detector, and a third electrical filter which passes only frequencies in the frequency range of said second modulated carrier wave, said third filter being connected between said output electrode and said second detector, and means connected to feed the detected output signal from said second detector to an input of said subtracting stage.

References Cited in the file of this patent

UNITED STATES PATENTS

| | | |
|---|---|---|
| 2,586,482 | Rose | Feb. 19, 1952 |
| 2,705,258 | Lesti | Mar. 29, 1955 |
| 2,733,291 | Kell | Jan. 31, 1956 |